(12) United States Patent
Baus et al.

(10) Patent No.: US 11,913,485 B2
(45) Date of Patent: *Feb. 27, 2024

(54) FORMED PLUNGER APPARATUS

(71) Applicant: Pivot Point, Incorporated, Hustisford, WI (US)

(72) Inventors: Roman J Baus, Rubicon, WI (US); Sol Leitzke, Hustisford, WI (US)

(73) Assignee: Pivot Point, Incorporated, Hustisford, WI (US)

( * ) Notice: Subject to any disclaimer, the term of this patent is extended or adjusted under 35 U.S.C. 154(b) by 546 days.

This patent is subject to a terminal disclaimer.

(21) Appl. No.: 16/999,752

(22) Filed: Aug. 21, 2020

(65) Prior Publication Data

US 2022/0056940 A1 Feb. 24, 2022

(51) Int. Cl.
*F16B 21/12* (2006.01)
*F16B 21/14* (2006.01)

(52) U.S. Cl.
CPC ............ *F16B 21/125* (2013.01); *F16B 21/14* (2021.08); *Y10T 403/604* (2015.01)

(58) Field of Classification Search
CPC ......... Y10T 403/32483; Y10T 403/604; F16B 19/109; F16B 21/125; F16B 21/14; F16B 3/04; F16B 25/0005
See application file for complete search history.

(56) References Cited

U.S. PATENT DOCUMENTS

| 1,210,669 | A | * | 1/1917 | Soltesz | F16B 39/04 411/211 |
| 1,992,093 | A | * | 2/1935 | Place | F16B 5/065 411/530 |
| 3,645,160 | A | * | 2/1972 | Artioli | F16B 2/248 411/347 |
| 4,725,174 | A | * | 2/1988 | Silcox | F16B 39/32 411/347 |
| 4,759,671 | A | * | 7/1988 | Duran | F16B 21/125 411/347 |
| 4,828,442 | A | * | 5/1989 | Duran | F16B 5/0208 411/970 |
| 5,639,177 | A | * | 6/1997 | Thomas | B62D 1/16 403/325 |
| 6,230,456 | B1 | * | 5/2001 | Merchlewitz | E06B 3/685 411/908 |

(Continued)

FOREIGN PATENT DOCUMENTS

GB 481 541 * 3/1938 ............ F16B 21/125

*Primary Examiner* — Michael P Ferguson
(74) *Attorney, Agent, or Firm* — RYAN KROMHOLZ & MANION, S.C.

(57) ABSTRACT

An improved plunger for a self-locking pin having a plunger section and a base section in a unitary one-piece construction, wherein the plunger section is at least substantially orthogonal to the base section. Wherein the base section comprises at least a substantially planar configuration, and may provide for biasing of the plunger section. A portion of the plunger extends outwardly from a bore of the self locking pin in which the plunger resides. The plunger section is preferably wedge-shaped, or may possess other geometrical shapes, while the portion of the plunger disposed inside the bore is of a cylindrical shape. An extended biasing section tor positioning of the plunger section may be in unitary construction with the base section.

3 Claims, 8 Drawing Sheets

(56) References Cited

U.S. PATENT DOCUMENTS 6,872,039 B2 * 3/2005 Baus ................. F16B 21/125
411/347
11,542,977 B2 * 1/2023 Baus ................. F16B 19/109

* cited by examiner

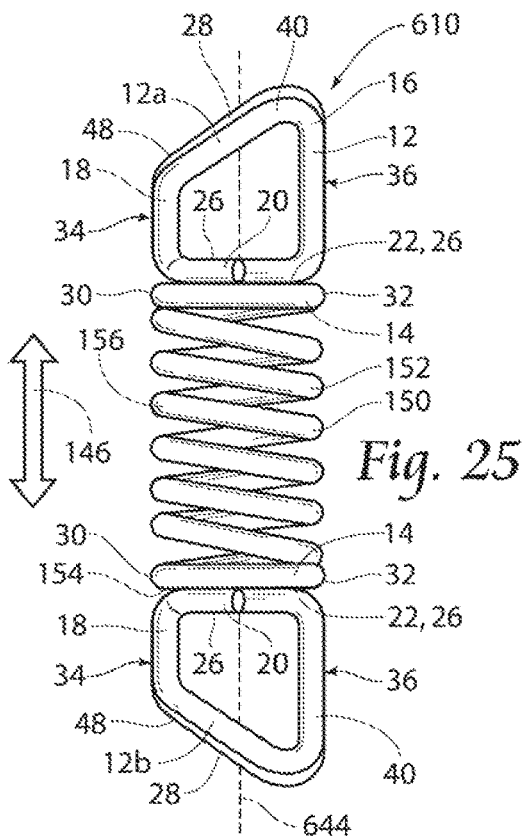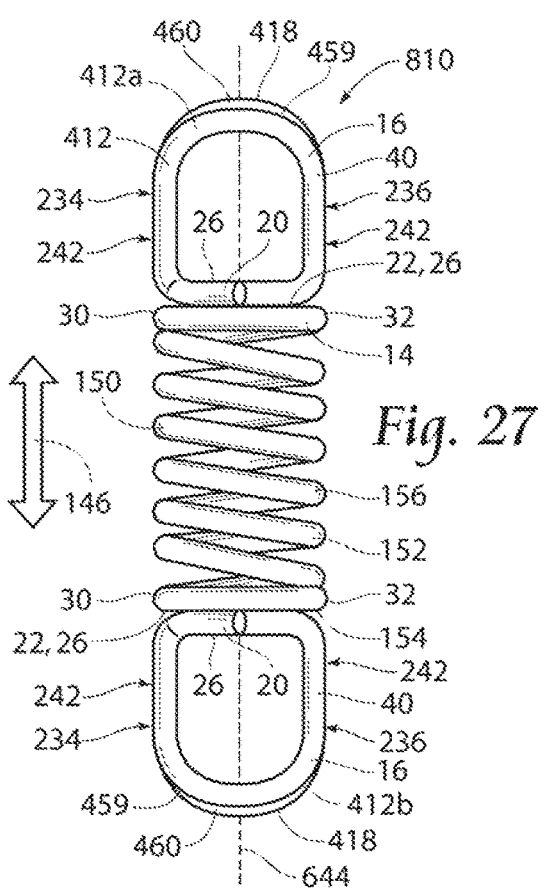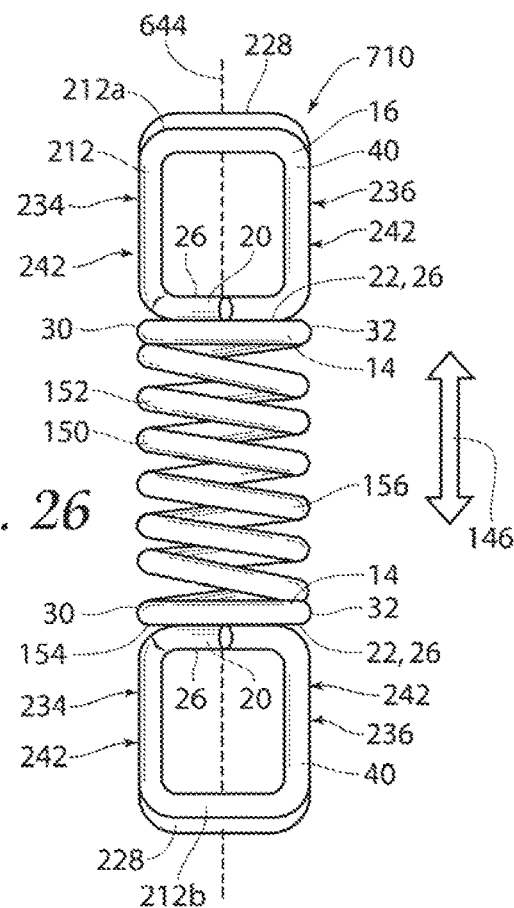

FORMED PLUNGER APPARATUS

BACKGROUND OF THE INVENTION

The invention relates to fasteners, namely threadless fasteners for retaining two or more structures through apertures formed in each structure. More specifically, the invention relates to plunger assemblies of the threadless fasteners.

Detent pins are well known in industry. Many of these pins fall into the category of safety bolts. Safety bolts have a threaded end to which a nut can be attached to as well as a detent mechanism along the length of the bolt. The main fastening mechanism in safety bolts is threading the nut on the end of the bolt. These products are often used in the aircraft industry so an extra safety factor is present in case vibrations cause the nut to loosen or someone forgets to tighten the nut. The detent mechanism is this extra safety factor. However, these dual fasteners make safety bolts more difficult and thus more expensive to manufacture. Additionally there are some applications where such a bolt cannot be used because it is either impractical or impossible to access the threaded end of the bolt after it is inserted through an aperture. Also, screwing the nut on the end of the bolt causes an increase in assembly time.

There has been a need in the market for a self-locking pin which is simple to manufacture and can be installed with little effort and in applications where there is no access to the opposing side of the work piece and thus a nut cannot be applied to the threaded end of a pin. Such self-locking pins have comprised a three-piece design consisting of a pin haring a bore. A separate spring and plunger are in contact with one another within the bore, where compression and extension of the spring moves the plunger. Advancements have been made in the design of the plunger wherein the spring and plunger are a unitary one-piece construction. However, dimensional restrictions, and cost optimization, may necessitate a plunger reducing, if not removing, the spring or biasing section.

Therefore, there is a need in the market for a plunger comprising a plunger section in a unitary construction with a base, such that the base either does not incorporate or reduces a size of a biasing section of the plunger. The plunger may have a formed metal wedge construction or an alternative shape.

SUMMARY OF THE INVENTION

The present invention is to an improved formed plunger apparatus, having a wedge or other shape, comprising a plunger section and a base in unitary one-piece construction. The unitary one-piece construction of the plunger facilitates easy installation of a pin, comprising the plunger, through an aperture in an object. In addition, the reduction, or lack thereof a biasing section, of the plunger provides for optimized production costs.

Embodiments of the invention comprise a plunger for use with a self-locking pin comprising: a plunger section and a base; the plunger section and the base are in a unitary one-piece construction; and the base comprises an at least substantially planar configuration.

The invention further comprises the plunger section is affixed to the base; the base is circular; the base comprises a wire; the base is a seat, wherein the seat is positioned in a bore of the self-locking pin and the plunger section is biased outwardly of the bore; the base provides for biasing of the plunger section orthogonal to a longitudinal axis of the self-locking pin; and the plunger section having at least one of a wedge shape, a square shape, a rectangular shape and a parabolic shape.

The invention additionally comprising the base is at least generally in contact with a helical biasing section opposite the plunger section; the base is in at least one of a unitary one-piece construction with the helical biasing section and a removable communication with the helical biasing section; and the plunger comprises at least one of a spring steel, a polymer and a composite material.

It is an intended benefit of the invention to provide the market a plunger comprising a plunger section in unitary construction with a base, such that the base either does not incorporate or reduces a slue of a biasing section of the plunger. In addition, the unitary one-piece construction of the plunger, with a plunger section and base section, optimizes costs associated with the plunger and a respective self-locking pin.

BRIEF DESCRIPTION OF THE DRAWINGS

FIG. 25 is a aids view of a seventh embodiment of the plunger of the invention.

FIG. 26 is a side view of an eighth embodiment of the plunger of the Invention.

FIG. 27 is a side view of a ninth embodiment of the plunger of the invention.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 28:
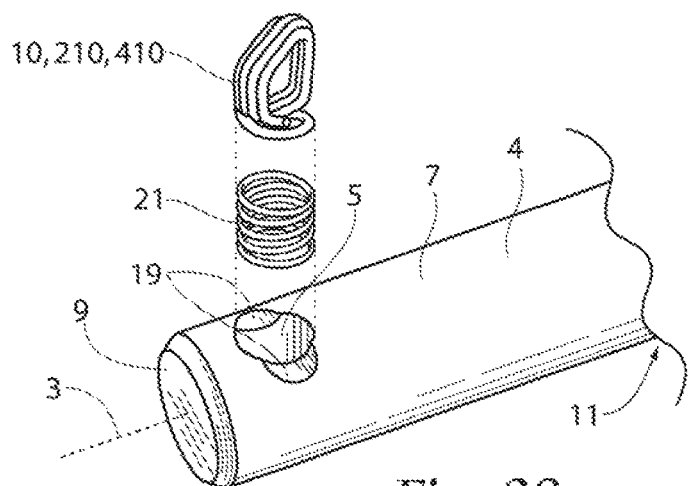
FIG. 28 is an exploded perspective view of the first embodiment of the plunger in communication with a self-locking pin.

With attention to FIGS. 1 to 4, a first embodiment of a plunger of the invention 10 is illustrated. The plunger 10 comprises a plunger section 12 and a base section 14 in unitary one-piece construction. As illustrated, the first embodiment of the plunger 10 provides for the plunger 10 as a wire 16 wound in a substantially circular manner to provide for the base section 14. The base section 14 comprises a base section first side 22 and a base section second side 24, opposite the first side 22. The base section 14 is at least substantially planar in configuration, wherein the first side 22 and second side 24 are opposite sides of the respective plane. Where in the second side 24 provides a seat, upon which the plunger 10 is positioned upright within a bore 5 (FIG. 28) of a self-locking pin 7 (FIG. 28). Proximal to a spring end 20, opposite the base, the wire 16 is helically wound in a winding 18 to provide for the plunger section 12. The helically winding 18 is at least substantially orthogonal to at least one of the first side 22 and the second side 24.

The first side 22 and the spring end 20 provide for a transition ledge 26. The windings of the helical pattern, winding 18, of the plunger section 12 are at least substantial parallel to one another and at least, substantially proximate to one another. Preferably the helical windings of the plunger section 12 are in contact with one another. The helical windings of the plunger section 12 are preferably oriented to provide for a wedge having a substantially planar surface 28. The planar surface 28 is sloped away from the base section 14 over its length from a plunger first side 30 to a plunger second side 32, opposite the plunger first side 30. The plunger first side 30 is provided in the front of the plunger 10. The plunger second side 32 is provided in the back of the plunger 10.

Figure 1:
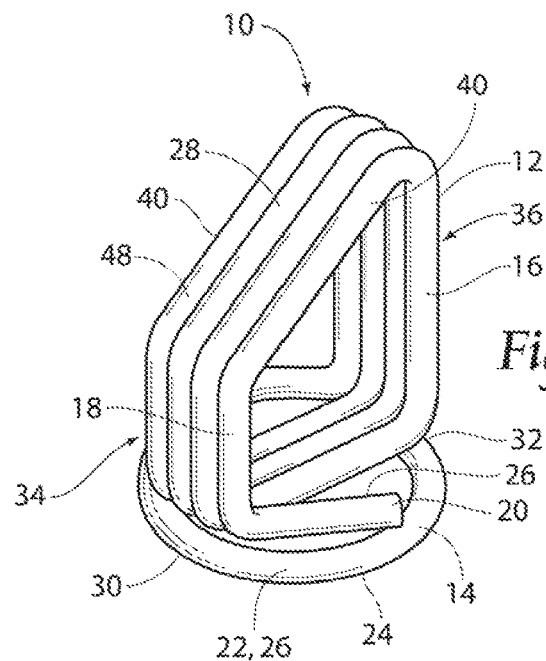
FIG. 1 is a perspective view of a first embodiment of a plunger of the invention.
Figure 2:
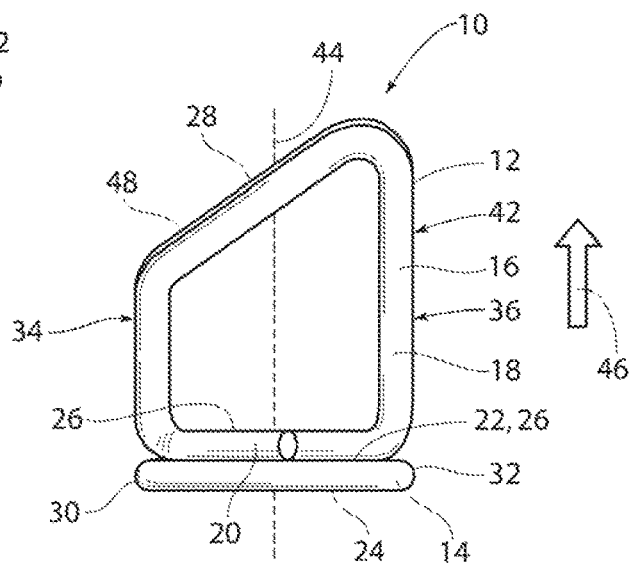
FIG. 2 is a side view of the first embodiment of the plunger of the invention.
Figure 3:
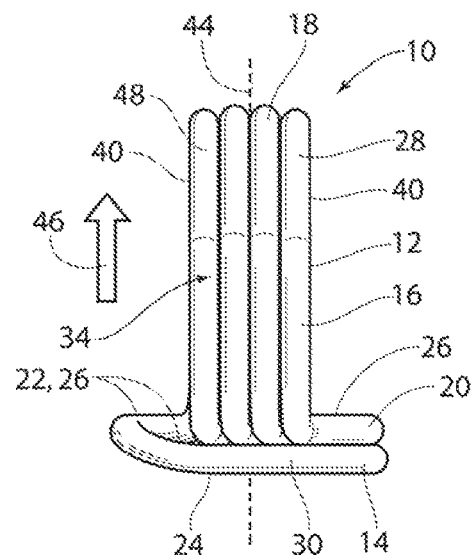
FIG. 3 is a front view of the first embodiment of the plunger of the invention.
Figure 4:
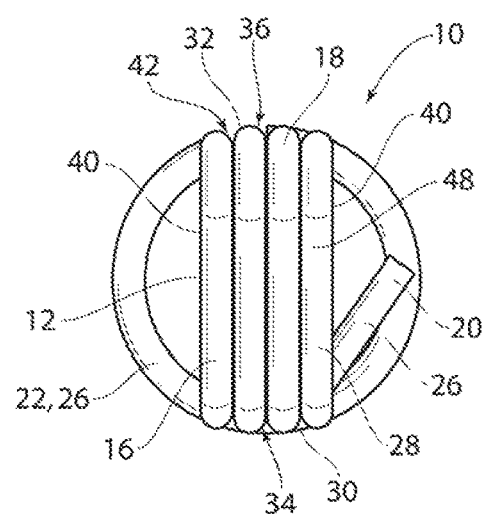
FIG. 4 is a top view of the first embodiment of the plunger of the invention.
Figure 5:
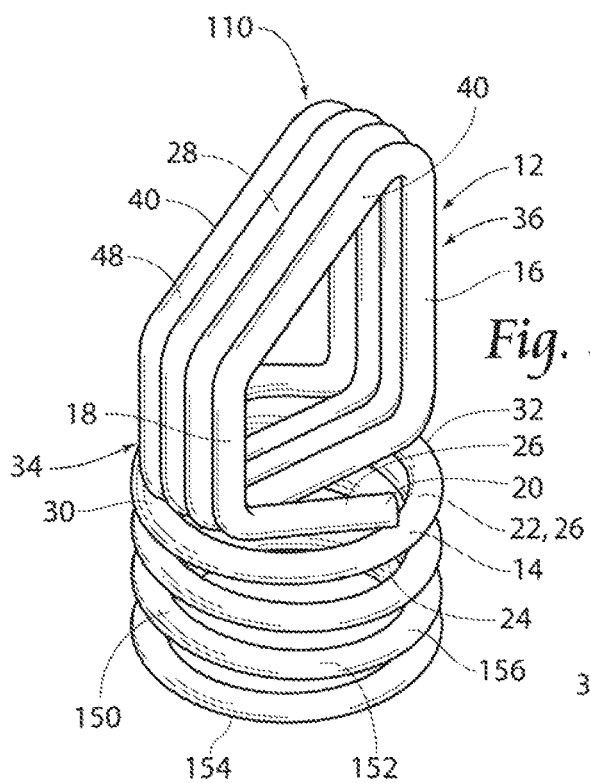
FIG. 5 is a perspective view of a second embodiment of the plunger of the invention.
Figure 6:
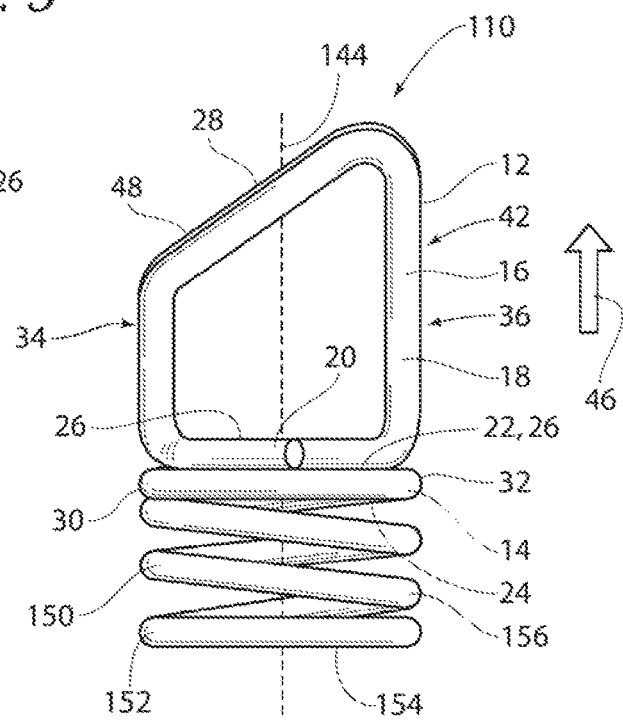
FIG. 6 is a side view of the second embodiment of the plunger of the invention.
Figure 7:
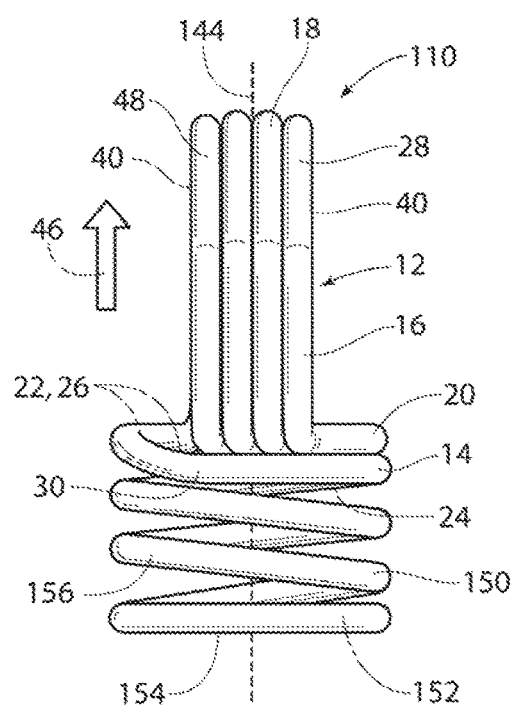
FIG. 7 is a front view of the second embodiment of the plunger of the invention.

As will be described hereinafter, the transition ledge 26 helps retain the plunger 10 in the bore 5 (FIG. 28) of a self-locking pin 7 (FIG. 28) in which the plunger 10 resides. A side of the plunger section 12 extending at least substantially orthogonal to the base section 14 on the plunger first side 30, proximate to the front 9 of the self-locking pin 7 (FIG. 28) in which the respective plunger 10 is positioned, is a plunger section leading side 34. A side of the plunger section 12 extending at least substantially orthogonal to the base section 14, proximate to the plunger second side 32, is the plunger section trailing side 36. The plunger section trailing side 36 is proximate to a back 11 of the self-locking pin 7 (FIG. 28), opposite the front 9 of the self-locking pin 7 (FIG. 28), in which the respective plunger 10 is positioned. At least one of the leading side 34 or the trailing side 36 extends in a first direction 46 from the base section 14. Further, at least one of the leading side 34 or the trailing side 36 is at least substantially parallel to a plunger longitudinal axis 44 of the plunger 10. Wherein the longitudinal axis 44 extends from the base section 14 to the planar surface 28. It is observed, the planar surface 28 is preferably positioned between the leading side 34 and the trailing side 36. As seen in FIGS. 1, 3 and 4, the plunger section 12 also has oppositely disposed lateral sides 40. In the preferred embodiment, the transition ledges 26 extend from each of the lateral sides 40 of the plunger section 12 and plunger 10 itself. An abutment 42 may be formed on the side opposite leading side 34 as shown in FIGS. 2 and 4.

It is observed that when the plunger 10 is inserted in the bore 5 (FIG. 28) of a respective self-locking pin 7 (FIG. 28), the longitudinal axis 44 of the plunger 10 is at least substantially orthogonal to a longitudinal axis 3 of the pin 7 (FIG. 28), extending from the front 9 of the self-locking pin 7 (FIG. 28) to the back 11 of the self-locking pin 7 (FIG. 28). The plunger section 12 of the plunger 10 is oriented to extend out of the bore 5 (FIG. 28). When the plunger 10, specifically the plunger section 12, is in its normal position in the bore 5 (FIG. 28), the planar surface 28 extends above the surface 4 of the shaft of the self-locking pin 7 (FIG. 28). The plunger section leading side 34 of the plunger section 12 is proximate the surface 4 of the shaft of the self-locking pin 7 (FIG. 28). The planar surface 28 of the plunger section 12, the plunger 10, extends angularly upwardly away from the surface 4 of the shaft of the self-locking pin 7 (FIG. 28) to define a ramped engaging surface 45, and where applicable the abutment 42. The abutment 42 is perpendicular or normal, or at least substantially perpendicular, to the longitudinal axis 3 of the shaft of the self-locking pin 7 (FIG. 28) and faces the direction of the back 11 of the self-locking pin 7 (FIG. 28). The longitudinal axis 3 of the shaft of the self-locking pin 7 (FIG. 28) is one in the same as the longitudinal axis 3 of the self-locking pin 7 (FIG. 28).

As to the plunger (10, 210 (FIGS. 9 to 12), 410 (FIGS. 17 to 20)), it is observed the plunger (10, 210 (FIGS. 9 to 12), 410 (FIGS. 27 to 20)) may be paired with a separate biasing section 21 (FIG. 28). Such that the separate biasing section 21 (FIG. 28) contacts the second side 24 of the base section 14.

In regular use, the self-locking pin 7 (FIG. 28), comprising the plunger 10, may be inserted through an aperture of at least one object having a restraining surface. The ramped engaging surface 48 of the plunger 10, plunger section 12, abuts an inner surface of the aperture. The force of the inner surface of the aperture against the ramped engaging surface 48 of the plunger 10 may cause the plunger section 12 to advance into the bore 5 (FIG. 28) until either or both of the ramped engaging surface 48 and the abutment 42 are no longer exposed. Where the separate biasing section 21 (FIG. 28) is employed, the force of the inner surface of the aperture against the ramped engaging surface 48 of the plunger 10 may cause the plunger section 12 to be pushed inwardly against the bias of the separate biasing section 21 (FIG. 28). The inward push advances the plunger section 32 into the bore until either or both of the ramped engaging surface 48 and the abutment 42 are no longer exposed. Once the self-locking pin 7 (FIG. 28) is installed and the ramped engaging surface 48 clears the aperture, the plunger 10 advances at least substantially perpendicular to the longitudinal axis 3 of the self-locking pin 7 (FIG. 28), and at least substantially parallel to the plunger longitudinal axis 44. Further, the abutment 42 of the plunger section 12, plunger 10, abuts the restraining surface of the object, preventing the self-locking pin 7 (FIG. 28) from being withdrawn from the aperture in a similar manner.

With attention to FIGS. 5 to 8, a second embodiment of the plunger of the invention 110 is illustrated. The second embodiment of the plunger 110 may incorporate at least one feature of the first embodiment of the plunger 10. Further, the second embodiment of the plunger 110 provides the wire 16 continues and further comprises the biasing section 150 attached to the second side 24 of the base section 14. The biasing section 150 comprises a second helical winding 152, which extends opposite the first direction 46 from the second side 24 to a plunger base 154 along a second embodiment of the longitudinal axis 144 of the plunger 110. It is observed the first direction 46 is at least substantially parallel to the longitudinal axis 144 of the plunger 110, which extends from the base 154 to the planar surface 28 of the plunger section 12. It is observed the second embodiment, of the longitudinal axis 144 of the plunger 110 comprises at least one feature of the first embodiment of the longitudinal axis 44. The second helical winding 152 comprises a second spring section 156, wherein the helical winding of the plunger 12 is a first spring section.

Figure 29:
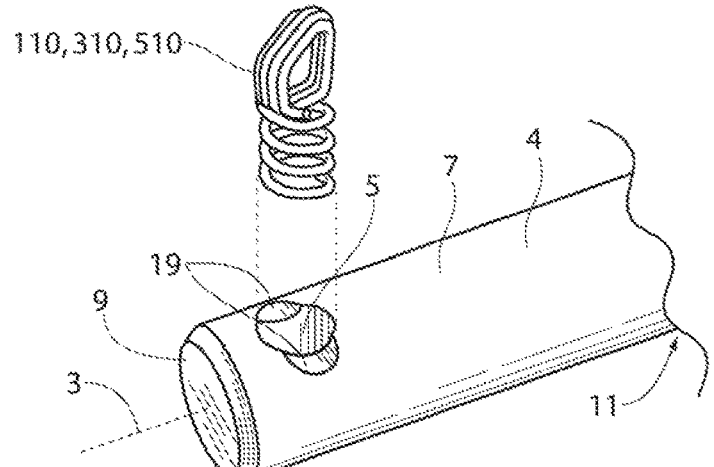
FIG. 29 is an exploded perspective view of the second embodiment of the plunger in communication with the self-locking pin.

The base section 14 comprises the final winding of the biasing section 150. Further, the final winding of the biasing section ISO and the respective spring end 20, both of which comprise the transition ledge 26, may be separated by the helical winding 18 of the plunger section 12. At the transition ledge 16, the second spring section 156 of the wire 16 is at least substantially orthogonal to the helical winding 18 of the plunger section 12. As previously described, it is observed the biasing section 150 functions similar to, and has the properties of, the separate biasing section 21 (FIG. 28), reference FIG. 29.

With attention to FIGS. 9 to 12, a third embodiment of a plunger of the invention 210 is illustrated. The third embodiment of the plunger 210 may incorporate at least one feature of the first embodiment of the plunger 10. The plunger 210 comprises a plunger section 212 and the base section 14 in a unitary one-piece construction. Proximal to a spring end 20, opposite the base, the wire 16 is helically wound in a winding 218 to provide for the plunger section 212. The helically winding 218 is at least substantially orthogonal to at least one of the first side 22 or the second side 24.

The first side 22 and the spring end 20 provide for a transition ledge 26. The windings of the helical pattern of the plunger section 212 are at least substantial parallel to one another and at least substantially proximate to one another. Preferably the helical windings of the plunger section 212 are in contact with one another. The helical windings of the second winding 218 are oriented to provide for a rectangular or square shape having a substantially planar surface 228 opposite the base section 14. The planar surface 228 is at least substantially horizontal.

Figure 10:
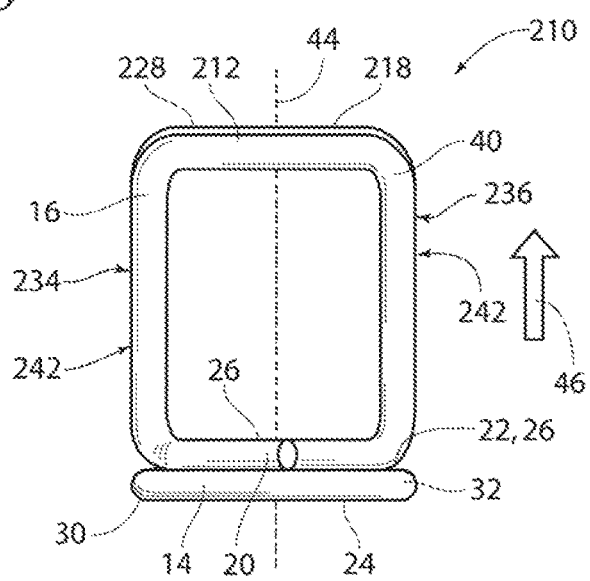
FIG. 10 is a side view of the third embodiment of the plunger of the invention.

As described, the transition ledge 26 helps retain the plunger 210 in the bore of a respective self-locking pin in which the plunger 210 is positioned. A side of the plunger section 212 extending at least substantially orthogonal to the base section 14 on the plunger first side 30, proximate to a front end of the self-locking pin 9 (FIG. 28) in which the respective plunger 210 is positioned, is a plunger section leading side 234. The side of the plunger section 212 extending at least substantially orthogonal to the base section 14, proximate to the plunger second side 32, is the plunger section trailing side 236. The plunger section trailing side 236 is proximate to a back 11 of the self-locking pin 7 (FIG. 28), opposite the front 9 of the self-locking pin 7 (FIG. 28), in which the respective plunger 210 is positioned. At least one of the leading side 234 and the trailing side 236 extends in a first direction 46 from the base section 14. Further, as seen in FIG. 10, at least one of the leading side 234 and the trailing side 236 is substantially parallel to a plunger longitudinal axis 44 of the plunger 210. Wherein the longitudinal axis 44 extends from the base section 14 to the planar surface 228.

Figure 8:
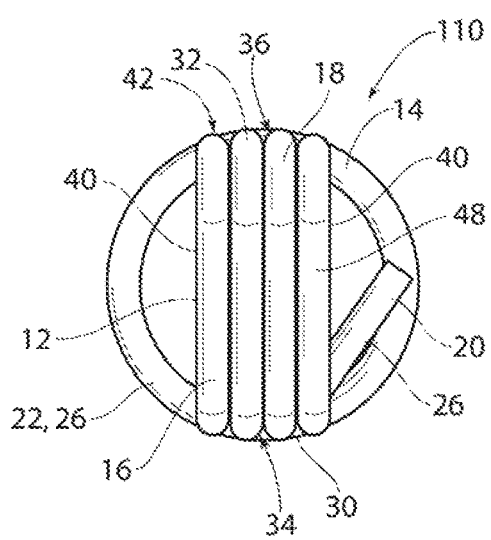
FIG. 8 is a top view of the second embodiment of the plunger of the invention.
Figure 9:
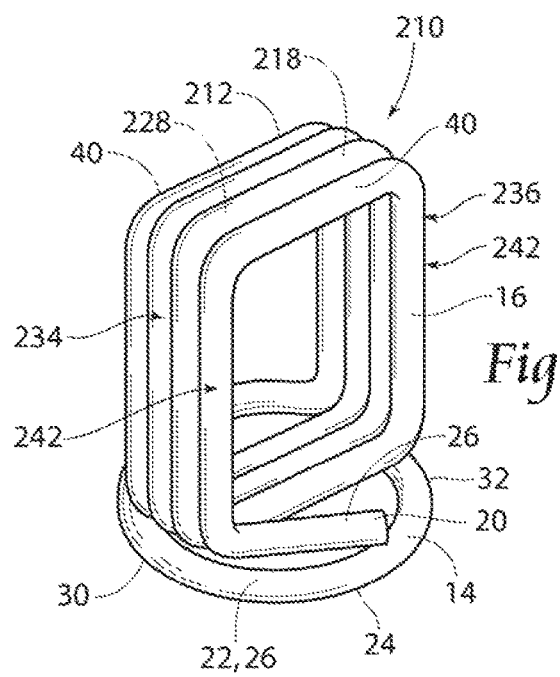
FIG. 9 a perspective view of a third embodiment of the plunger of the invention.
Figure 11:
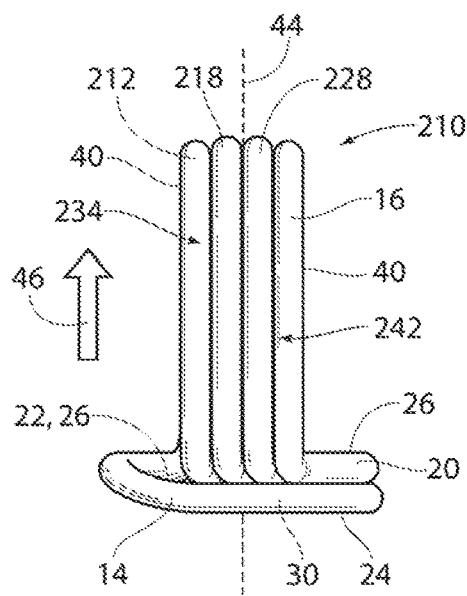
FIG. 11 is a front view of the third embodiment of the plunger of the invention.
Figure 12:
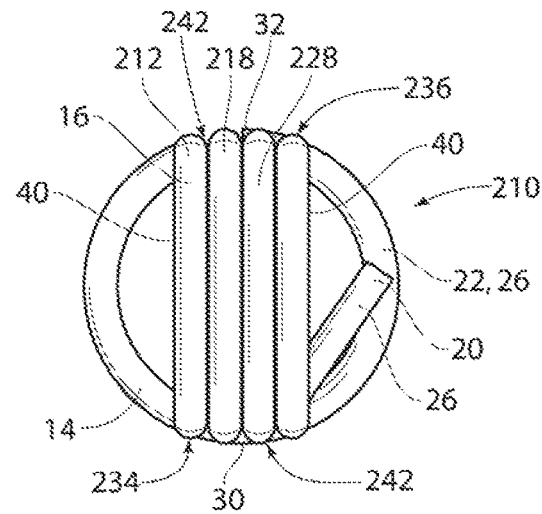
FIG. 12 is a top view of the third embodiment of the plunger of the invention.
Figure 13:
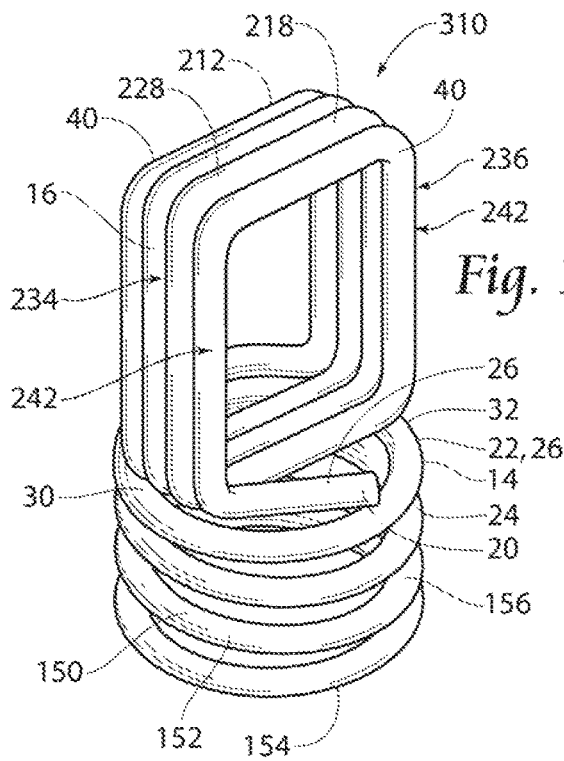
FIG. 13 is a perspective view of a fourth embodiment of the plunger of the invention.
Figure 14:
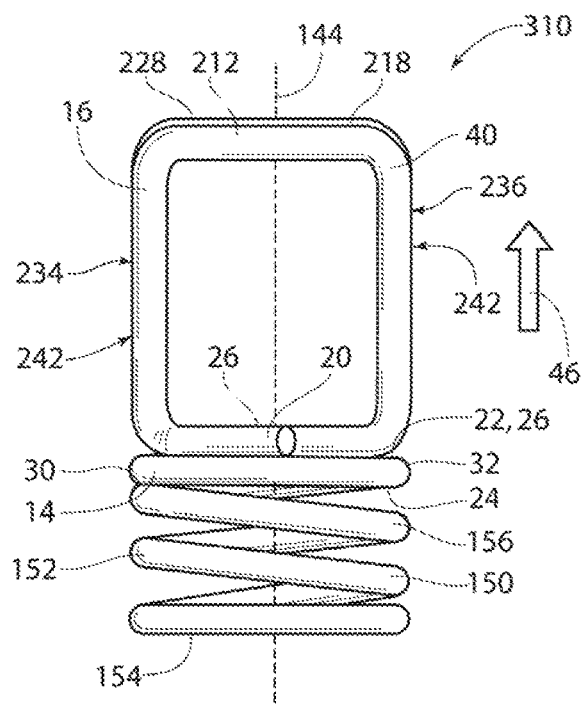
FIG. 14 is a side view of the fourth embodiment of the plunger of the invention.
Figure 15:
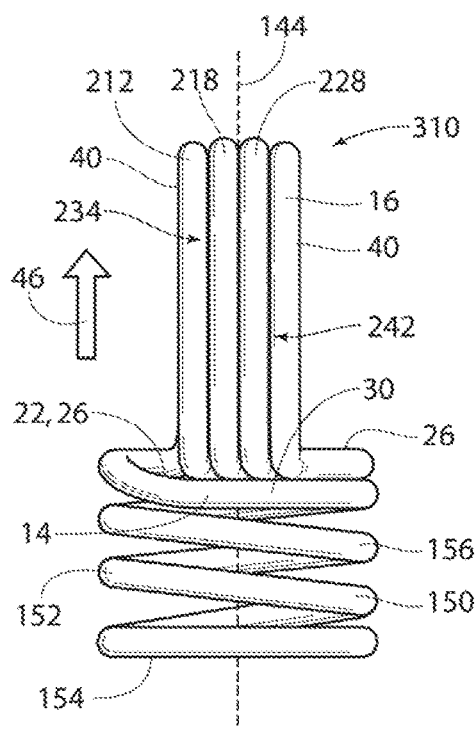
FIG. 15 is a front view of the fourth embodiment of the plunger of the invention.
Figure 16:
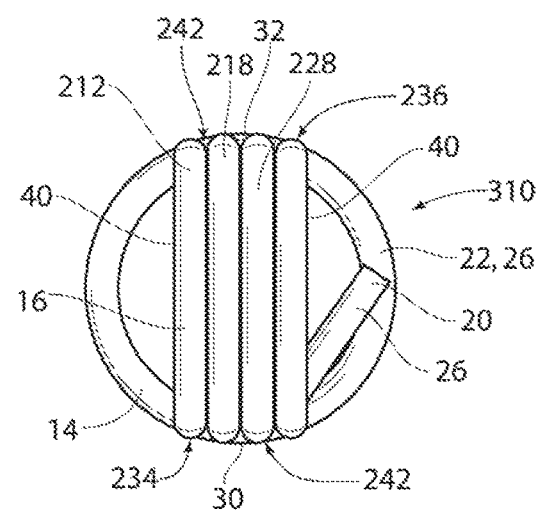
FIG. 16 is a top view of the fourth embodiment of the plunger of the invention.
Figure 17:
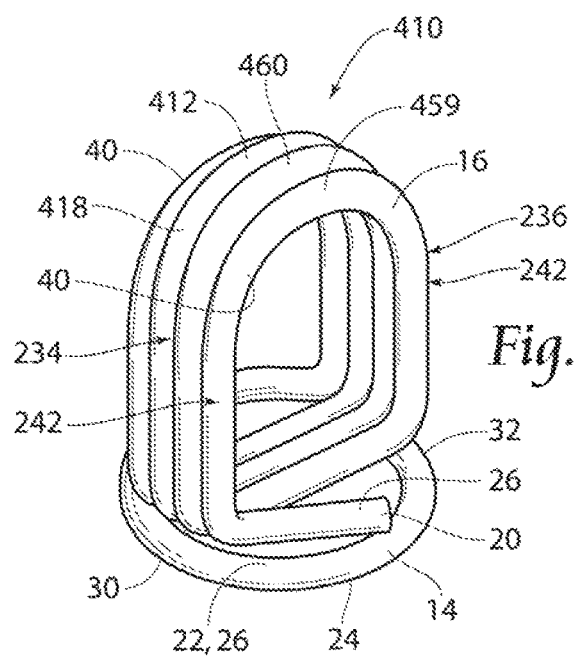
FIG. 17 is a perspective view of a fifth embodiment of the plunger of the invention.
Figure 18:
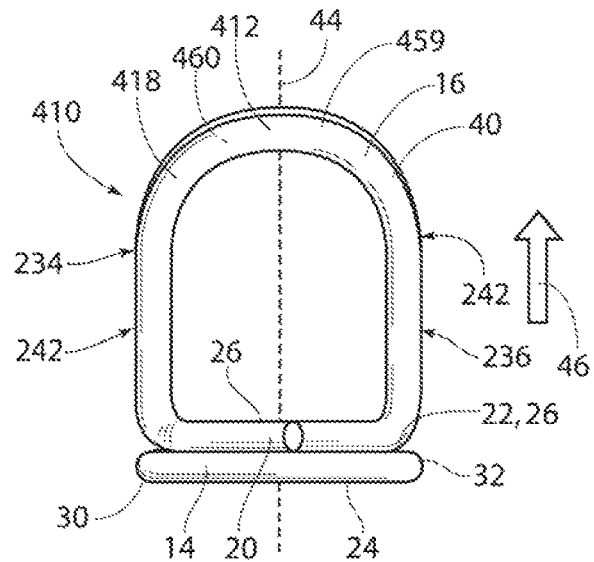
FIG. 18 is a side view of the fifth embodiment of the plunger of the invention.
Figure 19:
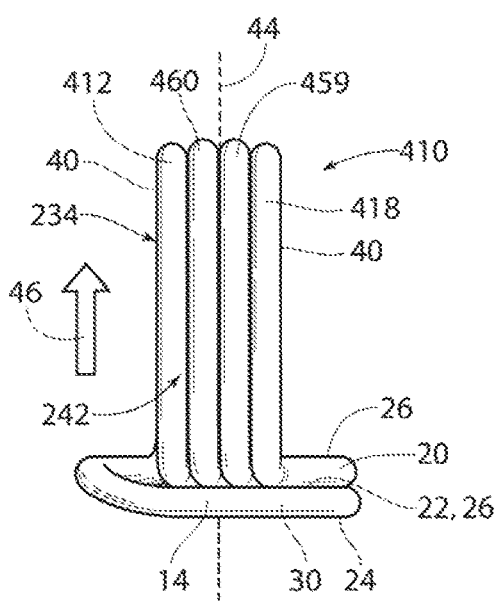
FIG. 19 is a front view of the fifth embodiment of the plunger of the invention.

The planar surface 228 is preferably positioned between the leading side 234 and the trailing side 236. As seen in FIGS. 8, 11 and 12, the plunger section 212 also has oppositely disposed lateral sides 40. In the preferred embodiment, the transition ledges 26 extend from each of the lateral sides 40 of the plunger section 212 and plunger 210 itself. An abutment 242, similar to the abutment 42 of the first embodiment of the plunger 10, may be formed on each of the leading side 234 and the trailing side 236. The planar surface 228 behaves in a similar manner to the planar surface 28 and ramped engaging surface 48 when the self-locking pin 7 (FIG. 28), in which the plunger 210 is placed, is inserted in and removed from a respective aperture. The plunger section 212 allows for the plunger 210 to abut the restraining surface of the object containing the aperture, and alternatively a surface of the respective object opposite the restraining surface, preventing the self-locking pin 7 (FIG. 28) from being withdrawn from the respective aperture in either direction. Either direction is either towards the front of the self-locking pin 9 (FIG. 28) or towards the back of the self-locking pin 11 (FIG. 28).

It is observed that when the plunger 210 is inserted in the bore of the self-locking pin 7 (FIG. 28), the longitudinal axis 44 of the plunger 210 is at least substantially orthogonal to a longitudinal axis 3 of the self-locking pin 7 (FIG. 28), extending from the front 9 of the self-locking pin 7 (FIG. 28) to the back 11 of the self-locking pin 7 (FIG. 28). The plunger section 212 of the plunger 210 is oriented to extend out of the bore 5 (FIG. 28) of the respective self-locking pin 7 (FIG. 28). Specifically, when the plunger 210, specifically the plunger section 212, is in its normal position in the bore, the planar surface 228 extends above the surface of the shaft of the self-locking pin 4 (FIG. 28).

With attention to FIGS. 13 to 16, a fourth embodiment of a plunger of the invention 310 is illustrated. The fourth embodiment of the plunger 310 may incorporate at least one feature of the first embodiment of the plunger 10, the second embodiment of the plunger 110, or the third embodiment of the plunger 210. Further the fourth embodiment of the plunger 310 provides the wire 16 continues and further comprises the biasing section 150 attached to the second side 24 of the base section 14. The biasing section 150 comprises the second helical winding 152, which extends opposite the first direction 46 from the second side 24 to the plunger base 154 along the second embodiment of the longitudinal axis 144 of the plunger 130. The second helical winding 152 comprises a second spring section 156, wherein the helical winding 218 of the plunger 212 is a first spring section. It is observed the first direction 46 is at least substantially parallel to the longitudinal axis 144 of the plunger 310, which extends from the base 154 to the planar surface 228 of the plunger section 212.

The base section 14 comprises the final winding of the biasing section 150. Further, the final winding of the biasing section 150 and the respective spring end 20, both comprising the transition ledge 26, are separated by the helical winding 218 of the plunger section 212. At the transition ledge 26, the second spring section 156 of the wire 16 is positioned at least substantially orthogonal to the helical winding 218 of the plunger section 212. It is observed the biasing section 150 functions similar to, and has the properties of, the separate biasing section 21 (FIG. 28) as previously described.

With attention to FIGS. 17 to 20, a fifth embodiment of a plunger of the invention 410 is illustrated. It is observed the fifth embodiment of the plunger 410 may incorporate at least one feature of at least one of the first embodiment of the plunger 10 or the third embodiment of the plunger 210. It is observed the plunger 410 comprises a plunger section 412 and the base section 14 in a unitary one-piece construction relationship as described in the first embodiment of the plunger 10 and the third embodiment of the plunger 210. Proximal to a spring end 20, opposite the base 14, the wire 16 is helically wound in a winding 418 to provide for the plunger section 412. The helically winding 418 is at least substantially orthogonal to at least one of the first side 22 and the second side 24.

The first side 22 and the spring end 20 provide for a transition ledge 26. As described, the transition ledge 26 helps retain the plunger 410 in the bore of a respective self-locking pin 7 (FIG. 28) in which the plunger 410 is positioned. The windings of the helical pattern, winding 418, of the plunger section 412 are at least substantial parallel to one another and at least substantially proximate to one another. Preferably the helical windings of the plunger section 412 are in contact with one another. The helical windings of the plunger section 412 are oriented to provide for an arch shape 459 with the leading side 234 and trailing side 236 separated by a parabolic surface 460. Where the parabolic surface 460, acting in a manner similar to the planar surface 228, is opposite the base section 14.

Figure 20:
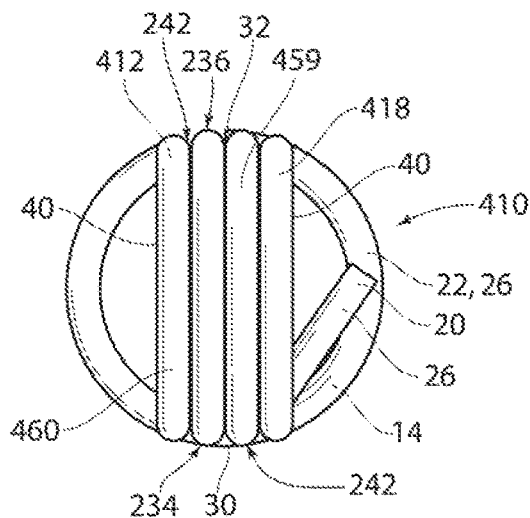
FIG. 20 is a top view of the fifth embodiment of the plunger of the invention.
Figure 21:
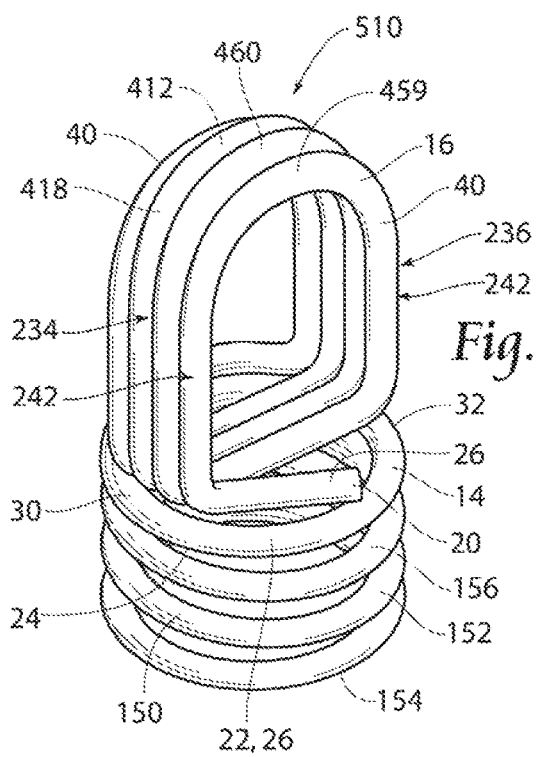
FIG. 21 is a perspective view of a sixth embodiment of the plunger of the invention.
Figure 22:
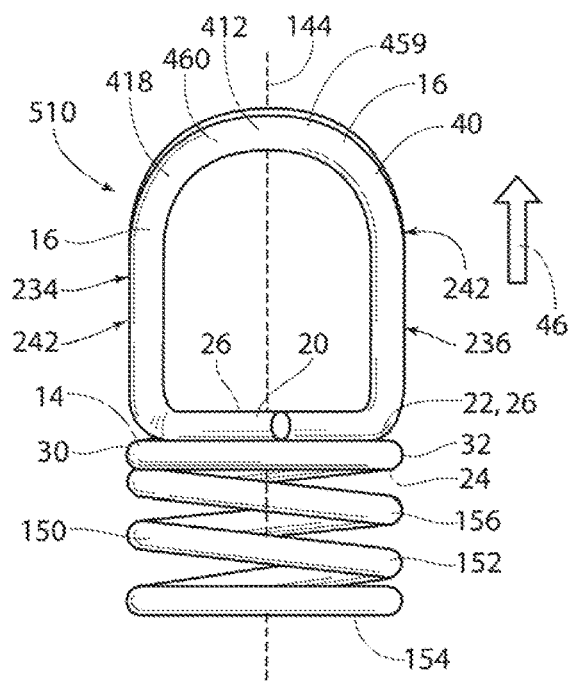
FIG. 22 is a side view of the sixth embodiment of the plunger of the invention.
Figure 23:
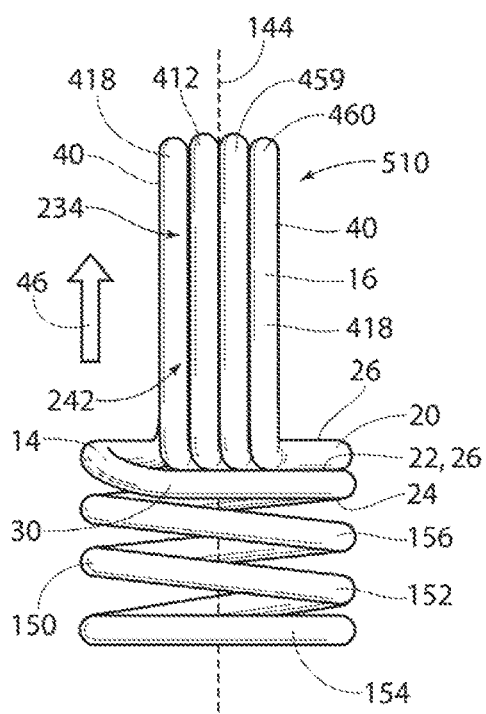
FIG. 23 is a front view of the sixth embodiment of the plunger of the Invention.
Figure 24:
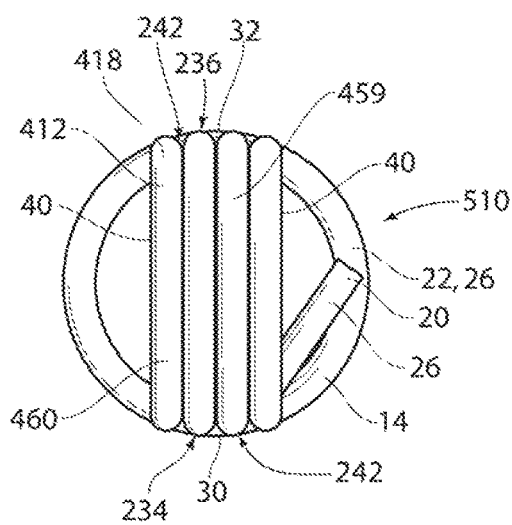
FIG. 24 is a top view of the sixth embodiment of the plunger of the invention.

The plunger section 412 allows for the plunger 410 to abut the restraining surface of the object containing the aperture, and alternatively a surface of the respective object opposite the restraining surface. This contact prevents the self-locking pin 7 (FIG. 28) from being withdrawn from the respective aperture in either direction, towards the front of the self-locking pin 9 (FIG. 28) or towards the back of the self-locking pin 11 (FIG. 20). Further, the parabolic arch of the parabolic surface 460 accommodates for the depression of the plunger section 412 which allows for insertion of the self-locking pin 7 (FIG. 28), containing the plunger 410, in an aperture as described in previous embodiments. Such that the parabolic arch of the parabolic surface 460 behaves in a similar manner to the planar surface (28, 228) when the self-locking pin 7 (FIG. 28), containing the plunger 410, is inserted in, or removed from, a respective aperture. Further, the parabolic arch of the parabolic surface 460 accommodates for a subsequent depression of the plunger section 412 and removal, of the self-locking pin 7 (FIG. 28), containing the plunger 410, from the aperture.

It is observed that when the plunger 410 is inserted in the bore of the self-locking pin 7 (FIG. 28), the longitudinal axis 44 of the plunger 410 is at least substantially orthogonal to a longitudinal axis 44 of the self-locking pin 3 (FIG. 28), extending from the front 9 of the self-locking pin 7 (FIG. 28) to the back 11 of the self-locking pin 7 (FIG. 28). The plunger section 412 of the plunger 410 is oriented to extend out of the bore 5 (FIG. 28) of the respective self-locking pin 7 (FIG. 28). When the plunger 410, specifically the plunger section 412, is in its normal position in the bore 5 (FIG. 28), the parabolic surface 460 extends above the surface of the shaft of the self-locking pin 4 (FIG. 28).

With attention to FIGS. 21 to 24, a sixth embodiment of a plunger of the invention 510 is illustrated. The sixth embodiment of the plunger 510 may incorporate at least one feature of the first embodiment of the plunger 10, the second embodiment of the plunger 110, the third embodiment of the plunger 210, or the fifth embodiment of the plunger 410. Further the sixth embodiment of the plunger 510 provides the wire 16 continues and further comprises a biasing section 150 attached to the second side 24 of the base section 14. The biasing section 150 comprises the second helical winding 152, which extends opposite the first direction 46 from the second side 24 to the plunger base 154 along the second embodiment of the longitudinal axis 144 of the plunger 510. The second helical winding 152 comprises a second spring section 156, wherein the helical winding 418 of the plunger section 412 is a first spring section.

The base section 14 comprises the final winding of the biasing section 150. Further, the final winding of the biasing section 150 and the respective spring end 20, both comprising the transition ledge 26, are separated by the helical winding 418 of the plunger section 412. At the transition ledge 26, the second spring section 156 of the wire 16 is at least, substantially positioned orthogonal to the helical winding 418 of the plunger section 412. It is observed the biasing section 150 functions similar to, and has the properties of, the separate biasing section 21 (FIG. 28) as previously described, reference FIG. 29.

With attention to FIGS. 1 to 24, 28 end 29, to assemble the plunger (10, 110, 210, 310, 410, 510) in the self-locking pin 7, the plunger (10, 110, 210, 310, 410, 510) is placed in the re-entrant bore 5. The self-locking pin 7 is held in place, with the plunger (10, 110, 210, 310, 410, 510) position, by one tool while another tool punches the shaft of the self-locking pin 4 using a radius stake punch perpendicular to the pin 7. The staking 19 causes a change in the shape of the shaft of the self-locking pin 4 around the entrance to the bore 5. The smooth round bore 5 is formed to a substantially oval shape with some depth. The shaft of the self-locking pin 4 may be staked on the lateral sides 40 of the plunger (10, 110, 210, 310, 410, 510). The staking 19 forms inwardly extending marginal portions. These inwardly extending portions abut the transition ledge 26 of the plunger (10, 110, 210, 310, 410, 510).

As to the plunger (10, 110, 210, 310, 419, 510), the inwardly extending portions abut the transition ledge 26 of the plunger (10, 110, 210, 310, 410, 510) as the base section 14, biasing section 150 or separate biasing section 21 urges the plunger section 12 of the plunger 10 outwardly of the bore 5. The edge of the staking 19 abuts the transition ledge 26, and lateral sides 40 where applicable, of the plunger (10, 110, 210, 310, 410, 510) and prevents the plunger (10, 110, 210, 310, 410, 510) from rotating within the bore 5 or being removed from the bore 5. Alternately, a single stake 19 may be placed in contact with the plunger second side 32 or a pair of stakes 19 may be placed in contact with the plunger first side 30, and the plunger second side 32.

Figure 30:
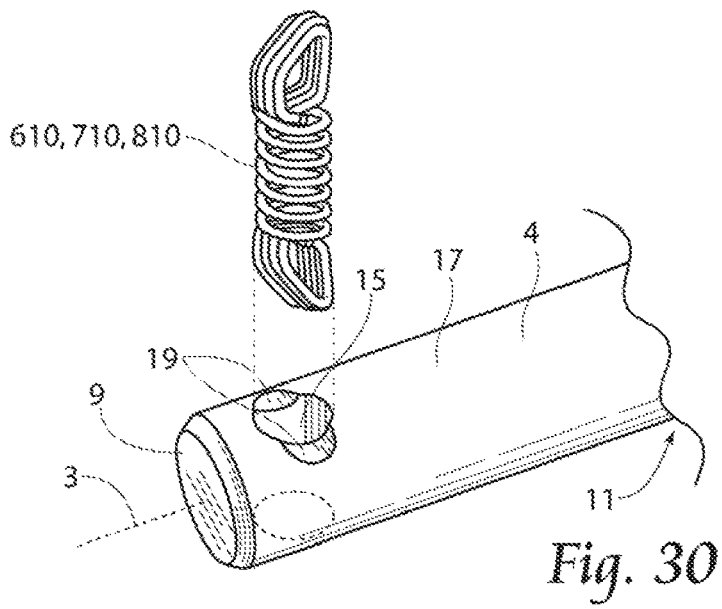
FIG. 30 is an exploded perspective view of the seventh embodiment of the plunger in communication with an alternative embodiment of the self-locking pin.

With attention to FIG. 25 a seventh embodiment of the plunger 610 is illustrated. The seventh embodiment of the plunger 610 may incorporate at least one feature of the first embodiment of the plunger 10, the second embodiment of the plunger 110, eighth embodiment of the plunger 710, or the ninth embodiment of the plunger 310. The seventh embodiment 610 comprises a first plunger section 12a having at least one of the features of the plunger section 12 of the first embodiment 10. Further, in the seventh embodiment 610 the plunger base 164 provides for a second plunger section 12b having at least one of the features of the first plunger section 12a, positioned opposite the first plunger section 12a along a second embodiment of the plunger travel direction 146. The plunger travel direction 146 illustrates the respective line of travel of the first plunger section 12a and the second plunger section 12b when in operation in an alternate embodiment of the self-locking pin 17 (FIG. 30), as described. It is observed the plunger travel direction 146 is at least substantially parallel to a third embodiment of the plunger longitudinal axis 644 of the plunger 610, which extends from the first plunger section 12a to the second plunger section 12b. It is observed the third embodiment of the longitudinal axis 644 of the plunger 610 comprises at least one feature of at least one of the first embodiment of the longitudinal axis 44 or the second embodiment of the longitudinal axis 144. It is observed the second embodiment of the plunger travel direction 146 comprises at least one feature of the travel direction 46.

With attention to FIG. 26 an eighth embodiment of the plunger 710 is illustrated. The eighth embodiment of the plunger 710 may incorporate at least one feature of the first embodiment of the plunger 10, the second embodiment of the plunger 110, the third embodiment of the plunger 210, the fourth embodiment of the plunger 310, seventh embodiment of the plunger 610 or the ninth embodiment of the plunger 810. The eighth embodiment 710 comprises a first plunger section 212a having at least one of the features of the plunger section 212 of the third embodiment 210. Further, in the eighth embodiment 710 the plunger base 154 provides for a second plunger section 212b having at least one of the features of the first plunger section 212a, positioned opposite the first plunger section 212a along the plunger travel direction 146. The plunger travel direction 146 illustrates the respective line of travel of the first plunger section 212a and the second plunger section 212b when in operation in an alternate embodiment of the self-locking pin 17 (FIG. 30), as described. It is observed the plunger travel direction 146 is at least substantially parallel to the longitudinal axis 644 of the plunger 710, which extends from the first plunger section 212a to the second plunger section 212b.

With attention to FIG. 27 a ninth embodiment of the plunger 810 is illustrated. The ninth embodiment of the plunger 810 may incorporate at least one feature of the first embodiment of the plunger 10, the second embodiment of the plunger 110, the third embodiment of the plunger 210, the fifth embodiment of the plunger 410, the seventh embodiment of the plunger 610, or the eighth embodiment of the plunger 710. The ninth embodiment 810 comprises a first plunger section 412a having at least one of the features of the plunger section 412 of the fifth embodiment 410. Further in the ninth embodiment SIC the plunger base 154 provides for a second plunger section 412b having at least one of the features of the first plunger section 412a, positioned opposite the first plunger section 412a along the plunger travel direction 146. The plunger travel direction 146 illustrates the respective line of travel of the first plunger section 412a and the second plunger section 412b when in operation in the alternate embodiment of the self-locking pin 17 (FIG. 30), as described. It is observed the plunger travel direction 146 is at least substantially parallel to the longitudinal axis 644 of the plunger 810, which extends from the first plunger section 412a to the second plunger section 412b.

With attention to FIGS. 25 to 27 and 30, it is observed, an alternate embodiment of the self-locking pin 17 may provide for, and is utilized with, at least one of the seventh embodiment of the plunger 610, the eighth embodiment of the plunger 710, or the ninth embodiment of the plunger 810. The plunger (610, 710, 810) is disposed in at least one thru bore 15. The shaft of the self-locking pin 4 may be staked 19 at the opening of the thru bore 15 to provide the stability and position control of the plunger (610, 710, 810), as described in the previous embodiments of the plunger (10, 110, 210, 310, 410, 510). When the plunger (610, 710, 810) is inserted in the bore 15 of the alternative embodiment of the self-locking pin 17, the longitudinal axis 644 of the plunger 610 is at least substantially orthogonal to a longitudinal axis 3 of the self-locking pin 7. The longitudinal axis 3 of the self-locking pin 7 extends from a front 9 of the self-locking pin 7 to a back 11 of the self-locking pin 7. The plunger section(s) (12, 12a, 12b, 212, 212a, 212b, 412, 412a, 412b) of the plunger (610, 710, 810) are oriented to extend out of the thru bore 15 of the alternative embodiment of the self-locking pin 17.

It is observed the plunger (10, 110, 210, 310, 410, 510, 610, 710, 810) may alternatively be comprised of at least one of alloy steels, carbon steel, stainless steel, aluminum alloys, spring steel, a polymer, or composite. The plunger 10 could be made from any suitable materials such as, but not limited to, alloy steels, carbon steels, stainless steel, or aluminum alleys as shall be discussed.

It is an intended benefit of the invention to provide the market, a plunger (10, 110, 210, 310, 410, 510, 810, 710, 810) comprising a plunger section (12, 212, 412) in unitary construction with a base section 14, such that the base section 14 either does not incorporate or reduces a size of a biasing section off the plunger. In addition, the unitary one-piece construction of the plunger (10, 110, 210, 310, 410, 510, 610, 710, 810), comprising a plunger section (12, 212, 412) and base section 14, optimizes costs associated with the plunger (10, 110, 210, 310, 410, 510, 610, 710, 810) and a respective self-locking pin (7, 17).

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

We claim:

1. A plunger disposed in a bore in a shaft of a self-locking pin, the plunger comprising:
   a single continuous piece of wire having first and second ends;
   the first end of said wire being helically wound three or more windings to form a plunger section, said plunger section comprising a plurality of substantially parallel helical coils proximate to one another and defining a first coil axis;
   the second end of said wire being helically wound to form a base section, said base section comprising a helical coil contiguous with an end coil of said plunger section and defining a second coil axis, said second coil axis being perpendicular to said first coil axis; and
   said helical wire windings of said plunger section being substantially orthogonal to said single wire winding of said base section, and a diameter of said winding of said base section being at least a width of said windings of said plunger section in a cross-sectional plane perpendicular to said first coil axis;

wherein the shaft of the self-locking pin has a longitudinal axis and the bore has a bore axis, the bore axis being perpendicular to the longitudinal axis; and wherein said base section of the plunger is coaxially disposed within the bore in the shaft of the self-locking pin and wherein a biasing force is applied to said base section, coaxial with said second coil axis of said base section, such to bias said plunger section outwardly from the shaft of the pin.

2. The plunger of claim 1, wherein said three or more helical wire windings of said plunger section has at least one of a wedge shape, a square shape, a rectangular shape and a parabolic shape.

3. The plunger of claim 1, further comprising a separate biasing section, wherein said separate biasing section provides for a spring biasing member for biasing said plunger section outwardly through said bore.

\* \* \* \* \*